(12) United States Patent
Paterson et al.

(10) Patent No.: US 7,060,309 B2
(45) Date of Patent: Jun. 13, 2006

(54) METHOD FOR VACUUM TREATMENT OF MEAT CONTAINING SODIUM BICARBONATE TO REDUCE THE APPEARANCE OF HOLES IN SUBSEQUENTLY COOKED MEAT

(75) Inventors: Bruce C. Paterson, Austin, MN (US); Daniel L. Franklin, Austin, MN (US); Karen M. Schiefelbein, Austin, MN (US)

(73) Assignee: Hormel Foods, LLC, Austin, MN (US)

( * ) Notice: Subject to any disclaimer, the term of this patent is extended or adjusted under 35 U.S.C. 154(b) by 397 days.

(21) Appl. No.: 10/361,808

(22) Filed: Feb. 7, 2003

(65) Prior Publication Data
US 2003/0180439 A1 Sep. 25, 2003

Related U.S. Application Data (60) Provisional application No. 60/355,531, filed on Feb. 8, 2002.

(51) Int. Cl.
*A23L 1/318* (2006.01)

(52) U.S. Cl. ........................ 426/281; 426/519; 426/641

(58) Field of Classification Search ................ 426/281, 426/519, 641; 99/472, 532
See application file for complete search history.

(56) References Cited

U.S. PATENT DOCUMENTS

| 4,409,704 A | * | 10/1983 | Seiffhart | 452/141 |
| 4,942,053 A | | 7/1990 | Franklin et al. | 426/524 |
| 6,020,012 A | | 2/2000 | Kauffman et al. | 426/281 |
| 6,040,013 A | | 3/2000 | Karales | 427/281 |

FOREIGN PATENT DOCUMENTS

| AU | 584764 | 1/1989 |
| EP | 0028113 | 6/1981 |
| EP | 0209268 | 1/1987 |
| JP | 55054854 | 4/1980 |

OTHER PUBLICATIONS

Meat Focus International, Riëtte van Laack, Effect of Sodium Bicarbonate on the Quality of Pork, Nov. 1996, pp. 392-393.

* cited by examiner

*Primary Examiner*—Arthur L. Corbin
(74) *Attorney, Agent, or Firm*—IPLM Group, P.A.

(57) ABSTRACT

A method for processing and treating meat to reduce an appearance of holes after the meat has been cooked includes infusing the meat with sodium bicarbonate, placing the infused meat in a vessel, and applying a vacuum within the vessel.

23 Claims, 10 Drawing Sheets

METHOD FOR VACUUM TREATMENT OF MEAT CONTAINING SODIUM BICARBONATE TO REDUCE THE APPEARANCE OF HOLES IN SUBSEQUENTLY COOKED MEAT

This application claims the benefit of U.S. Provisional Patent Application No. 60/355,531, filed Feb. 8, 2002.

BACKGROUND OF THE INVENTION

1. Field of the Invention

The present invention relates to a method for vacuum treatment of meat containing sodium bicarbonate to reduce the appearance of holes in the subsequently cooked meat.

2. Description of the Prior Art

Consumers often use color and appearance to judge the quality of meat products such as tenderness and taste, but such quality attributes are actually difficult to quantify from visual appraisal. Because most meat products are purchased based upon a visual inspection, "abnormal" coloration often has an adverse effect on the salability of the meat. It is known that a rapid fall in pH within meat post-mortem while muscle temperature remains high and/or a low pH (<5.60) at the end of 24 hours post-mortem results in acidic conditions which give rise to lower quality meat. It has been found that sodium bicarbonate has an elevating and stabilizing effect on the ultimate pH of muscle. Therefore, sodium bicarbonate is useful for injecting into meat products to improve the color, water retention, and organoleptic properties of the meat. Various types of meat can be treated with sodium bicarbonate including poultry, lamb, beef, and pork. One method for treating meat with sodium bicarbonate is disclosed in U.S. Pat. No. 6,020,012 by Kauffman et al. This method injects an early post-mortem, pre-rigor mortis carcass with one or more enhancement solutions including sodium bicarbonate that serve to reduce the rate and extent of pH decline of the meat on the carcass.

However, there is a problem of holes occurring in the meat treated with sodium bicarbonate after the meat has been cooked. The holes occur because the carbon dioxide in the sodium bicarbonate solution comes out of solution when the meat is cooked thereby causing holes to appear in the meat. Holes could also occur when moisture is contained in the meat because the moisture creates holes when it is removed from the meat or if the moisture freezes and expands within the meat. In addition, needles puncturing the meat may also create holes in the meat. Although the quality of the meat is not compromised, the meat may not be as aesthetically pleasing upon visual inspection. Therefore, it is desired to prevent the holes from forming while the meat is cooked.

SUMMARY OF THE INVENTION

A method for processing and treating meat, comprising placing meat in a vessel, the meat including holes, applying a vacuum within the vessel, and cooking the meat, the vacuum reducing the appearance of the holes in the meat after the meat has been cooked.

Another method for processing and treating meat to reduce an appearance of holes after the meat has been cooked includes infusing the meat with sodium bicarbonate, placing the infused meat in a vessel, and applying a vacuum within the vessel.

Another method for processing meat and treating meat to reduce an appearance of holes after the meat has been cooked includes infusing meat with at least 0.15% sodium bicarbonate, placing the infused meat in a vessel, and applying vacuum at approximately 3.5 to 50 Torr within the vessel for at least 15 minutes.

Another method for processing and treating meat includes infusing meat with a gas-releasing chemical, the gas-releasing chemical being used to preserve the meat, placing the infused meat in a vessel, applying a vacuum within the vessel, the vacuum expanding and removing gases within the meat from the gas-releasing chemical, and cooking the meat, wherein an appearance of holes from the gas-releasing chemical is reduced after the meat has been cooked.

DETAILED DESCRIPTION OF THE PREFERRED EMBODIMENT

The present invention relates to a method for vacuum treatment of meat containing sodium bicarbonate to reduce the appearance of holes in the meat after the meat has been cooked. Although the present invention is described for processing and treating pork, it is understood that other types of meat such as poultry and beef may be treated with the present method as well. The term meat is being used herein to describe pork, poultry, and beef.

Although the present invention is discussed with regard to reducing the appearance of holes in meat caused by infusion of the meat with sodium bicarbonate, it is recognized that holes may also be caused by injection needles, gas-releasing compounds within the meat, physical reactions within the meat, and/or chemical reactions within the meat. The appearance of such holes may also be reduced using the present invention.

In conventional tumbling, the interior walls of the tumbler are provided with a plurality of baffles or flights that enhance the stirring action and lift the meat pieces above the axis of the drum rotation so that they can fall onto other meat pieces at the bottom of the drum thereby enhancing the stirring and the physical beating or massaging of the meat. The meat could also be massaged by an augering action of muscle upon muscle during the tumbling process. A vacuum is then drawn, the vacuum pump is disconnected from communication with the drum, and the tumbling action is begun by driving the drum in rotation. As the drum contents are tumbled, the pressure slowly increases in the interior of the drum as a result of the gases escaping from the meat pieces and the vaporization of liquid contents within the drum. One common practice is to use industrial size tumblers that may hold on the order of 8,000 to 20,000 pounds of meat. Rotation is continued for approximately a half hour time interval, followed by a time interval, such as approximately half an hour, of no tumbling, which is termed a "rest period." Conventionally, the tumbling period and the rest period are alternated for an eight hour period. By the time the tumbling is complete, the interior pressure has risen substantially over the eight hour period. The meat products are then removed and packaged or processed further.

One method for treating meat with sodium bicarbonate is disclosed in U.S. Pat. No. 6,020,012 by Kauffman et al., which is incorporated by reference herein. This method injects an early post-mortem, pre-rigor mortis carcass with one or more enhancement solutions including sodium bicarbonate that serve to reduce the rate and extent of pH decline in the meat on the carcass. First, the sodium bicarbonate is mixed into enhancement solution with other ingredients known in the art. The meat is then injected with the enhancement solution having an amount of sodium bicarbonate less than or equal to 0.50% of the original meat weight before the enhancement solution is injected. Any number of commercially available injection devices known in the art may be used. Alternatively, infusion by other means well known in the art may be performed to treat the meat with sodium bicarbonate. In the present invention, however, the meat may be injected with preferably 0.10 to 0.50% sodium bicarbonate either pre-rigor mortis or post-rigor mortis before the meat is cooked.

After the meat has been injected/infused with sodium bicarbonate and before the meat is cooked, vacuum treatment of the meat (preferably less than 251 Torr) in a vacuum vessel for preferably up to 1.5 hours helps reduce the appearance of holes in the meat after the meat is cooked. Any suitable amount of vacuum may be used for a suitable period of time to effectively reduce the appearance of holes in meat, and it is recognized that the vacuum treatment and the time are related such that the greater Torr used the more time is generally needed and the less Torr used the less time is generally needed. Approximately 3.5 to 50 Torr for approximately 20 to 30 minutes is most preferred. The vacuum is either applied on a batch basis or a continuous basis. When the batch basis is used, a sealed vessel is evacuated to the desired level and then the product is processed. In a continuous basis, the vacuum is applied continuously during the process through a rotary or stationary connection, depending upon whether the vessel is rotating. An example of a vacuum vessel that may be used is a CHALLENGE™ meat massager manufactured by Challenge-RMF, Inc. of Grandview, Mo. The higher the vacuum level the less time is required to obtain the desired results.

In addition, tumbling of the meat under vacuum is not critical but helps reduce the amount of time for applying the vacuum to the meat to obtain the desired results. When the product is tumbled under vacuum, the product is placed in a sealed drum. The drum is rotated and the vacuum is applied through a rotary joint. Therefore, the vacuum treatment of meat injected with sodium bicarbonate improves the color, water retention, and organoleptic properties of the meat and reduces the appearance of holes in the cooked meat. After the meat has been vacuum treated, the meat may then packaged, stored, and distributed as usual.

EXAMPLE 1

Tests were conducted to determine the optimum vacuum level to receive a significant reduction in the appearance of holes in pork loins injected with enhancement solution containing 0.30% sodium bicarbonate.

First, eighty boneless pork loins were selected and sixteen pork loins were randomly assigned to five different treatments. The first treatment was the control treatment, which was 12% injection of an enhancement solution without sodium bicarbonate into the meat. An enhancement solution is commonly used for improving one or more of the following: tenderness, flavor, and juiciness. The second treatment was injection of the enhancement solution containing 0.30% sodium bicarbonate. The third treatment was injection of the enhancement solution containing 0.30% sodium bicarbonate, vacuum of 10 Torr, and tumbling for 30 minutes. The fourth treatment was injection of the enhancement solution containing 0.30% sodium bicarbonate, vacuum of 40 Torr, and tumbling for 30 minutes. The fifth treatment was injection of the enhancement solution containing 0.30% sodium bicarbonate, vacuum of 100 Torr, and tumbling for 30 minutes. The tumbler was operated at 6 RPM. The pork loins were then injected with either 12% enhancement solution without sodium bicarbonate or 12% enhancement solution containing 0.30% sodium bicarbonate, the percentage of enhancement solution based on the meat weight before injection, depending upon the assigned treatment.

The pork loins were then treated with one of the vacuum treatments with tumbling for 30 minutes. The pork loins were removed from the tumbler, vacuum packaged immediately after each tumbling cycle, shrink wrapped and placed in a steam kettle with boiling water, and boxed and stored at less than 40° F. for seven days. The pork loins were then removed from the vacuum packaging. The rib ends were removed from each pork loin and discarded. With each pork loin, a one inch chop and a six inch roast were randomly cut. The chops were cooked on a George Forman Grill to an internal temperature of 160° F., and the roasts were cooked in a convection oven at 350° F. to an internal temperature of 160° F. After cooking, the chops were sliced and scored in a cross-sectional view and the roasts were cut into three pieces and scored in a cross-sectional view to determine the percentage of holes in the meat.

The percentages of holes that appeared in the meat were determined based on an eight point scale. The cross-sectional pieces of the roasts were visually inspected and subjectively assigned a number 0 through 8 based on the eight point scale. Zero represented no saturation with holes, approximately 0%. One represented trace saturation with holes, approximately 1 to 12%. Two represented little saturation with holes, approximately 13 to 24%. Three represented slight saturation with holes, approximately 25 to 36%. Four represented modest saturation with holes, approximately 37 to 50%. Five represented moderate saturation with holes, approximately 51 to 63%. Six represented extensive saturation with holes, approximately 64 to 76%. Seven represented extreme saturation with holes, approximately 77 to 89%. Eight represented total saturation with holes, approximately 90 to 100%.

Each vacuum level was held until the specified vacuum level was achieved and then tumbled for 30 minutes. The results were as shown in the following Table 1:

TABLE 1

Treatments of Pork Loins under Different Levels of Vacuum

| Vacuum Level (Torr) | Injection Solution | Hole Score | Standard Deviation | Percentage of Hole Reduction |
|---|---|---|---|---|
| None | Enhancement solution without sodium bicarbonate | 0.367 | 0.581 | — |
| None | Enhancement solution containing 0.30% sodium bicarbonate | 7.750 | 0.447 | — |
| 10 | Enhancement solution containing 0.30% sodium bicarbonate | 0.656 | 0.676 | 91.540 |
| 40 | Enhancement solution containing 0.30% sodium bicarbonate | 1.321 | 1.030 | 82.950 |
| 100 | Enhancement solution containing 0.30% sodium bicarbonate | 3.429 | 1.910 | 55.750 |

Figure 1:
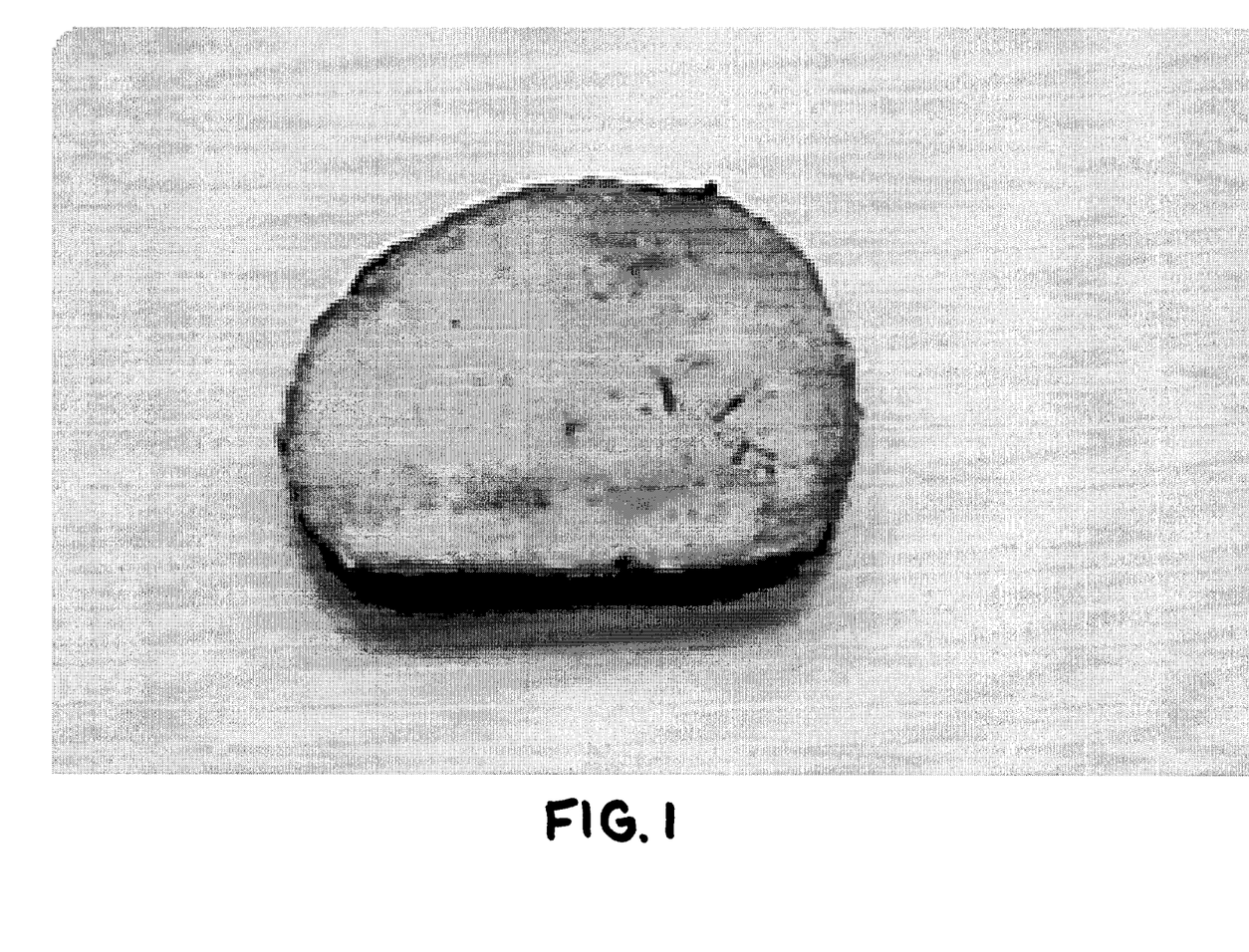
FIG. 1 shows a boneless loin treated with a 12% injection of a enhancement solution without sodium bicarbonate.
Figure 2:
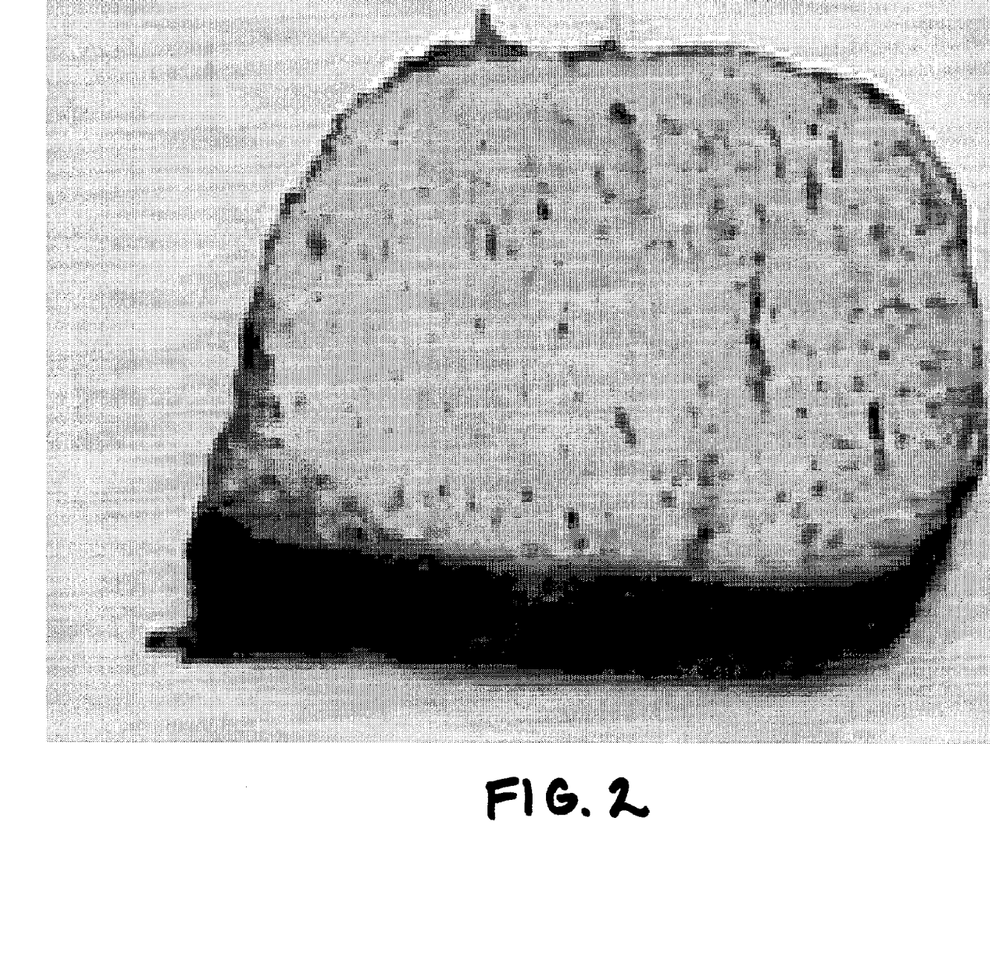
FIG. 2 shows a boneless loin treated with a 12% enhancement solution containing 0.30% sodium bicarbonate.
Figure 3:
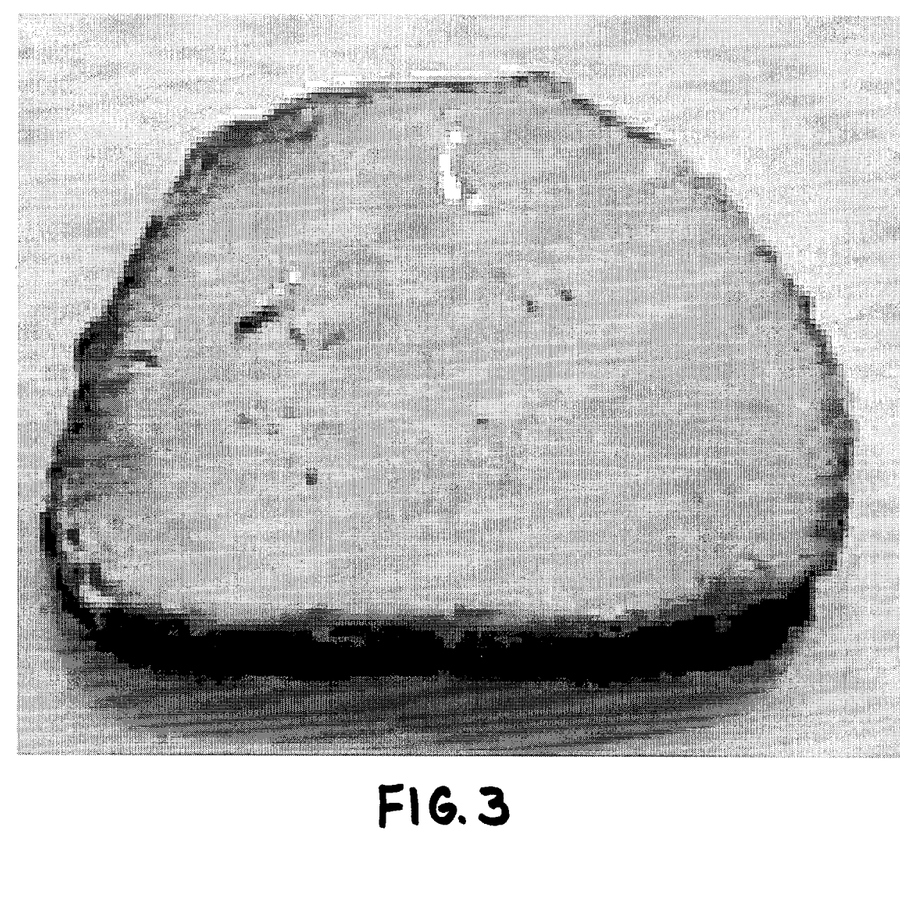
FIG. 3 shows a boneless loin treated with a 12% enhancement solution containing 0.30% sodium bicarbonate and tumbled for 30 minutes under vacuum of 10 Torr.
Figure 4:
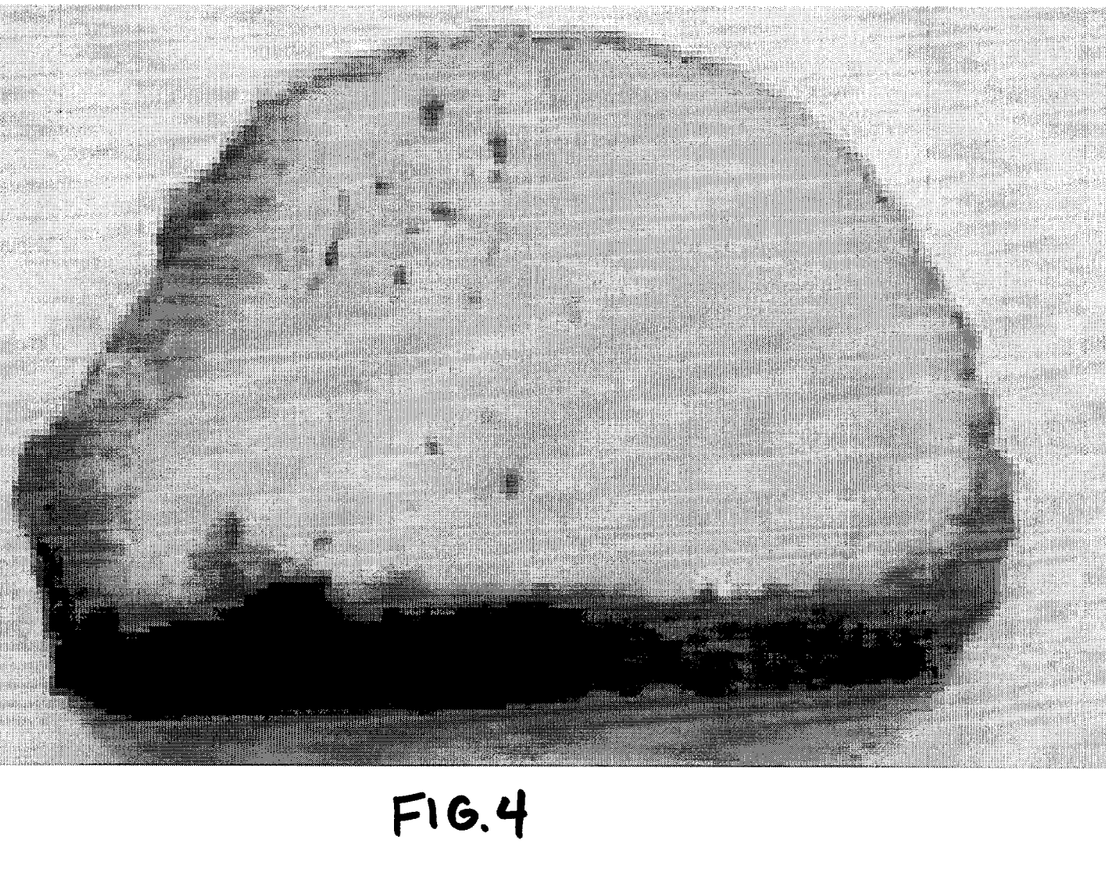
FIG. 4 shows a boneless loin treated with a 12% enhancement solution containing 0.30% sodium bicarbonate and tumbled for 30 minutes under vacuum of 40 Torr.
Figure 5:
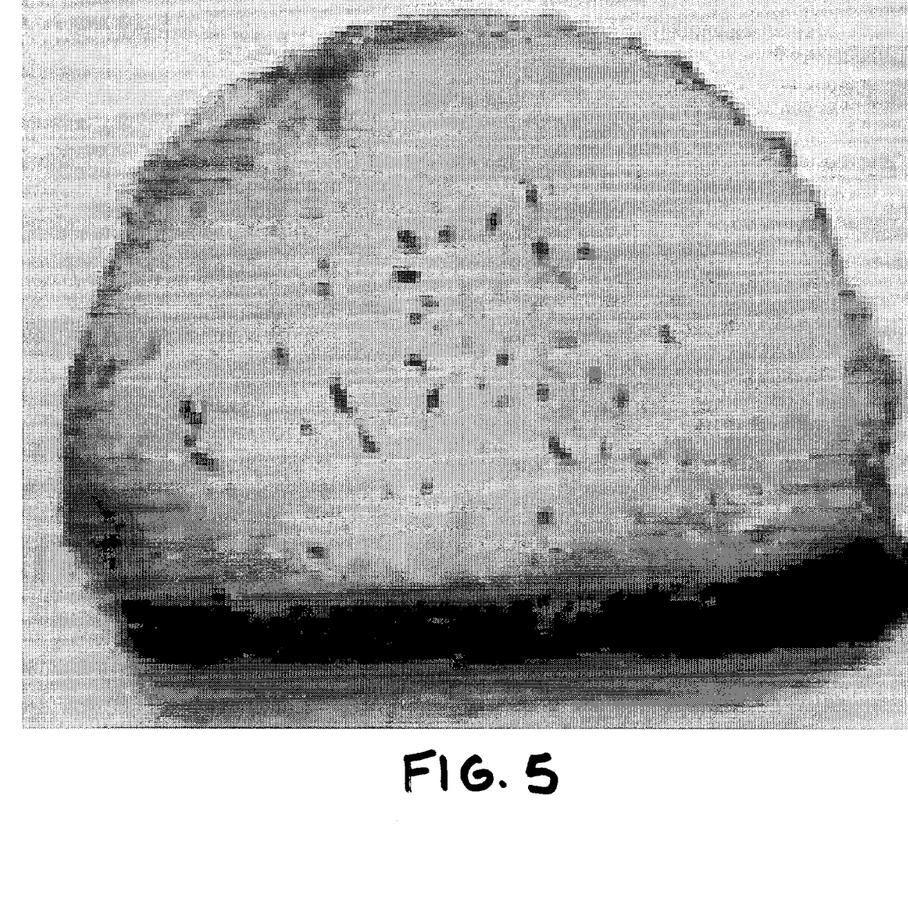
FIG. 5 shows a boneless loin treated with a 12% enhancement solution containing 0.30% sodium bicarbonate and tumbled for 30 minutes under vacuum of 100 Torr.

In addition, FIGS. 1–5 are photographs of the cooked, cross-sectional pieces of roasts treated with each of the five treatments to show the reduction in the appearance of holes in the meat after the meat has been cooked. FIG. 1 shows a boneless loin treated with a 12% injection of an enhancement solution without sodium bicarbonate. FIG. 2 shows a boneless loin treated with a 12% enhancement solution containing 0.30% sodium bicarbonate. FIG. 3 shows a boneless loin treated with a 12% enhancement solution containing 0.30% sodium bicarbonate and tumbled for 30 minutes under vacuum of 10 Torr. FIG. 4 shows a boneless loin treated with a 12% enhancement solution containing 0.30% sodium bicarbonate and tumbled for 30 minutes under vacuum of 40 Torr. FIG. 5 shows a boneless loin treated with a 12% enhancement solution containing 0.30% sodium bicarbonate and tumbled for 30 minutes under vacuum of 100 Torr.

As evidenced by the application of no vacuum, shown in Table 1 and FIGS. 1–2, the enhancement solution containing 0.30% sodium bicarbonate creates more holes in the meat after cooking than the enhancement solution without sodium bicarbonate. By tumbling the pork loins under a vacuum level of 10 Torr, the appearance of holes created by the addition of sodium bicarbonate was significantly reduced approximately 91.50%. At the 40 and 100 Torr vacuum levels, the reduction of the appearance of holes was still significant relative to the control, but did not have as extensive results as seen at the 10 Torr level. Therefore, given these results, it would be most beneficial to use a vacuum level of 10 Torr to reduce the number of holes in pork loins injected with enhancement solution containing 0.30% sodium bicarbonate. Generally, it is preferred to use a vacuum of less than 150 Torr for up to 1.5 hours, most preferably a vacuum of approximately 3.5 to 50 Torr for approximately 20 to 30 minutes.

EXAMPLE 2

Tests were conducted to determine the optimum tumbling time to receive a significant reduction in the appearance of holes in pork loins injected with enhancement solution containing 0.30% sodium bicarbonate.

First, eighty boneless pork loins were selected and sixteen pork loins were randomly assigned to five different treatments. The first treatment was the control treatment, which was 12% injection of an enhancement solution without sodium bicarbonate into the meat. The second treatment was injection of the enhancement solution containing 0.30% sodium bicarbonate. The third treatment was injection of the enhancement solution containing 0.30% sodium bicarbonate, vacuum of 10 Torr, and tumbling for 15 minutes. The fourth treatment was injection of the enhancement solution containing 0.30% sodium bicarbonate, vacuum of 10 Torr, and tumbling for 30 minutes. The fifth treatment was injection of the enhancement solution containing 0.30% sodium bicarbonate, vacuum of 10 Torr, and tumbling for 45 minutes. The tumbler was operated at 6 RPM. The pork loins were then injected with either 12% enhancement solution without sodium bicarbonate or 12% enhancement solution containing 0.30% sodium bicarbonate, the percentage of enhancement solution based on the meat weight before injection, depending upon the assigned treatment.

The pork loins were then treated with one of the tumbling treatments under a vacuum of 10 Torr. The pork loins were removed from the tumbler, vacuum packaged immediately after each tumbling cycle, shrink wrapped and placed in a steam kettle with boiling water, and boxed and stored at less than 40° F. for seven days. The pork loins were then removed from the vacuum packaging. The rib ends were removed from each pork loin and discarded. With each pork loin, two one inch chops and two six inch roasts were randomly cut. Of the 160 total chops, 80 chops were cooked on a George Forman Grill and 80 chops were cooked on a Weber Grill to an internal temperature of 160° F. Of the 160 total roasts, 80 roasts were cooked in a convection oven and 80 roasts were cooked in a conventional oven at 350° F. to an internal temperature of 160° F. After cooking, the chops were sliced and scored in a cross-sectional view and the roasts were cut into three pieces and scored in a cross-sectional view to determine the percentage of holes in the meat.

The percentages of holes that appeared in the meat were determined based on an eight point scale, as previously noted in Example 1. Each vacuum time was allowed to reach 10 Torr before the tumbling cycle began. The results were as shown in the following Tables 2 and 3:

TABLE 2

Treatments for Pork Loin Roasts Cooked in a Convection Oven

| Tumbling Time (minutes) | Injection Solution | Hole Score | Standard Deviation | Percentage of Hole Reduction |
|---|---|---|---|---|
| 0 | Enhancement solution without sodium bicarbonate | 0.219 | 0.315 | — |
| 0 | Enhancement solution containing 0.30% sodium bicarbonate | 6.250 | 2.463 | — |
| 15 | Enhancement solution containing 0.30% sodium bicarbonate | 1.533 | 1.060 | 75.470 |
| 30 | Enhancement solution containing 0.30% sodium bicarbonate | 0.808 | 0.879 | 87.080 |
| 45 | Enhancement solution containing 0.30% sodium bicarbonate | 0.133 | 0.315 | 97.870 |

TABLE 3

Treatments for Pork Loin Roasts Cooked in a Conventional Oven

| Tumbling Time (minutes) | Solution | Hole Score | Standard Deviation | Percentage of Hole Reduction |
|---|---|---|---|---|
| 0 | Enhancement solution without sodium bicarbonate | 0.393 | 0.525 | — |
| 0 | Enhancement solution containing 0.30% sodium bicarbonate | 6.231 | 2.736 | — |
| 15 | Enhancement solution containing 0.30% sodium bicarbonate | 0.571 | 0.616 | 90.840 |
| 30 | Enhancement solution containing 0.30% sodium bicarbonate | 0.125 | 0.311 | 97.990 |
| 45 | Enhancement solution containing 0.30% sodium bicarbonate | 0.045 | 0.151 | 99.280 |

Figure 6:
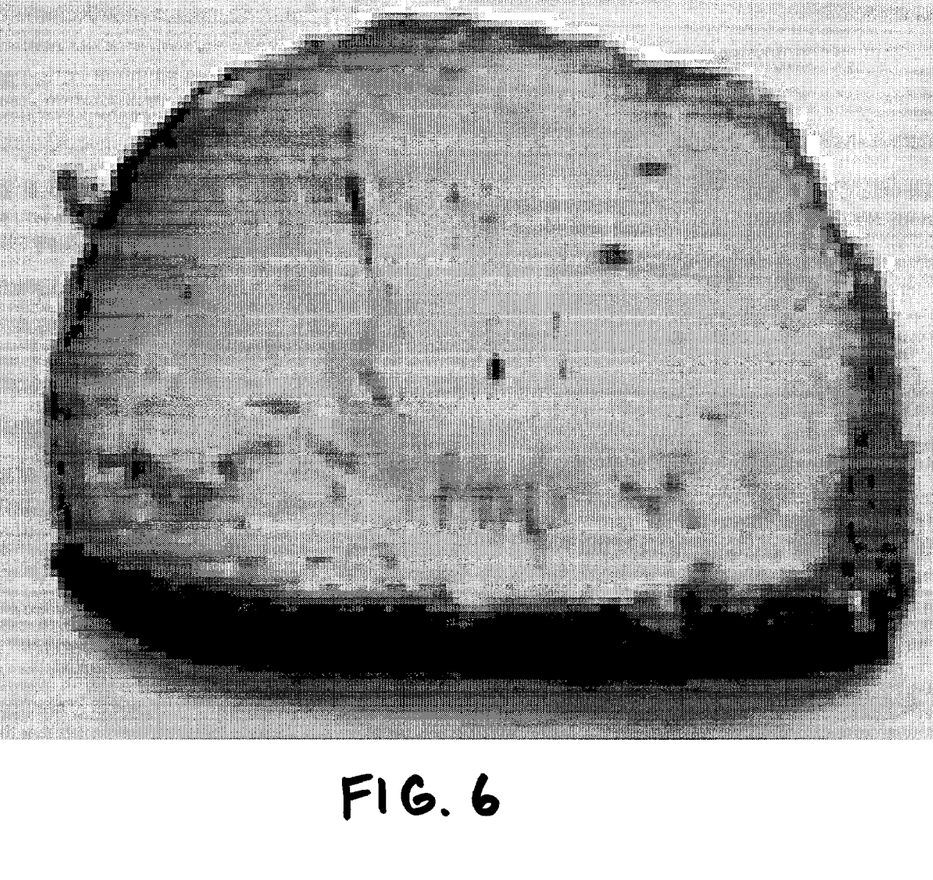
FIG. 6 shows a boneless loin treated with a 12% injection of a enhancement solution without sodium bicarbonate.
Figure 7:
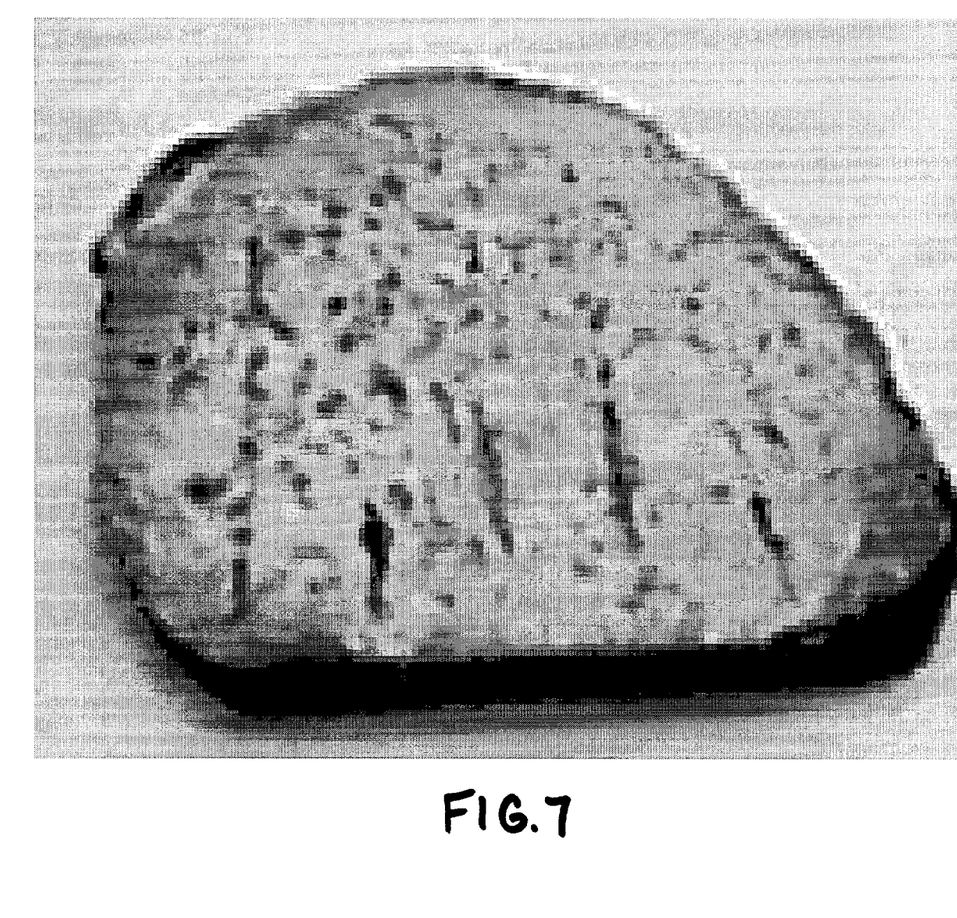
FIG. 7 shows a boneless loin treated with a 12% enhancement solution containing 0.30% sodium bicarbonate.
Figure 8:
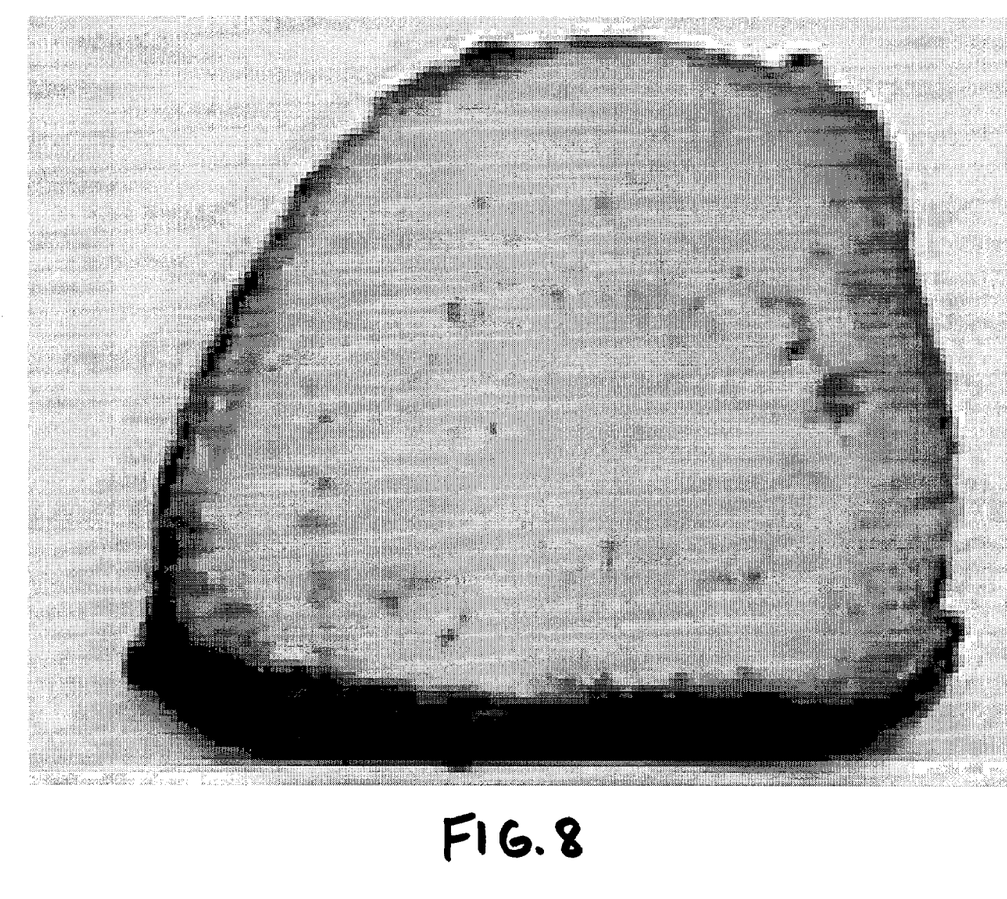
FIG. 8 shows a boneless loin treated with a 12% enhancement solution containing 0.30% sodium bicarbonate and tumbled for 15 minutes under vacuum of 10 Torr.
Figure 9:
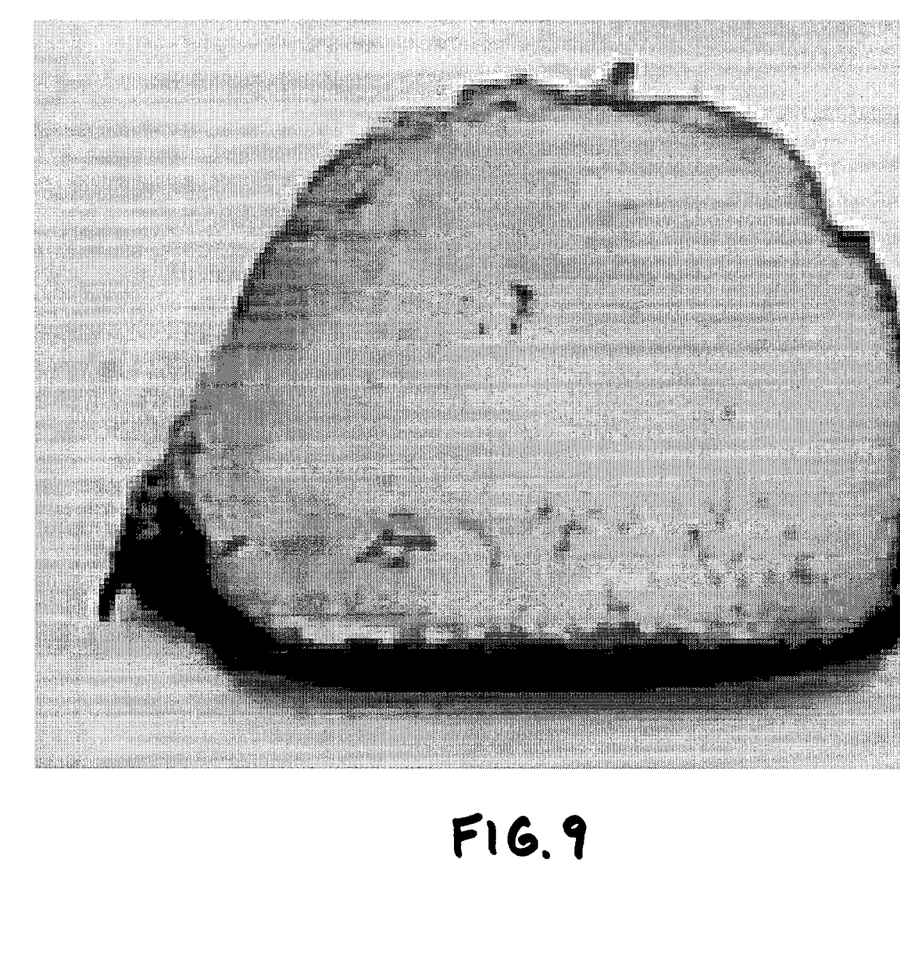
FIG. 9 shows a boneless loin treated with a 12% enhancement solution containing 0.30% sodium bicarbonate and tumbled for 30 minutes under vacuum of 10 Torr.
Figure 10:
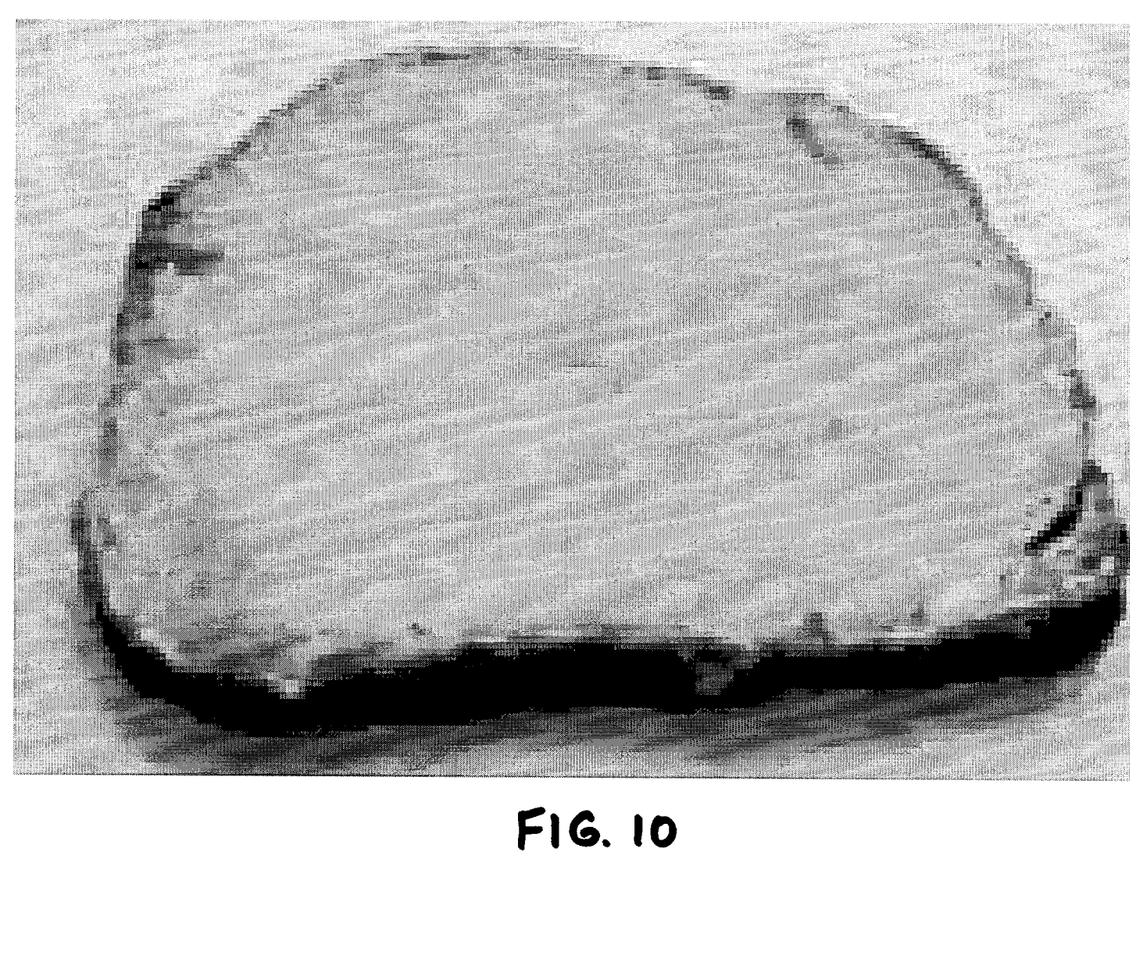
FIG. 10 shows a boneless loin treated with a 12% enhancement solution containing 0.30% sodium bicarbonate and tumbled for 45 minutes under vacuum of 10 Torr.

In addition, FIGS. 6–10 are photographs of the cooked, cross-sectional pieces of roasts treated with each of the five treatments to show the reduction in the appearance of holes in the meat after the meat has been cooked in a convection oven. FIG. 6 shows a boneless loin treated with a 12% injection of an enhancement solution without sodium bicarbonate. FIG. 7 shows a boneless loin treated with a 12% enhancement solution containing 0.30% sodium bicarbonate. FIG. 8 shows a boneless loin treated with a 12% enhancement solution containing 0.30% sodium bicarbonate and tumbled for 15 minutes under vacuum of 10 Torr. FIG. 9 shows a boneless loin treated with a 12% enhancement solution containing 0.30% sodium bicarbonate and tumbled for 30 minutes under vacuum of 10 Torr. FIG. 10 shows a boneless loin treated with a 12% enhancement solution containing 0.30% sodium bicarbonate and tumbled for 45 minutes under vacuum of 10 Torr.

The results shown in Tables 2 and 3 indicate that roasts cooked in the convection oven had higher hole-scores (higher percentages of holes) than roasts cooked in the conventional oven. This could be indicative of the rate of cooking in which a convection oven usually cooks 30% faster than a conventional oven.

As shown in Tables 2 and 3 and in FIGS. 6–10, by tumbling the pork loins under vacuum for 15 minutes, the number of holes created by the addition of sodium bicarbonate is significantly reduced. However, further tumbling for 30 to 45 minutes further reduces the number of holes observed in the cross-sectional view of each roast by 88.46% and 98.10%, respectively. Therefore, the preferred tumbling time is at least 15 minutes, most preferably 15 to 30 minutes. If higher concentrations of sodium bicarbonate are used, longer tumbling times may be needed to significantly reduce the appearance of holes in the meat.

EXAMPLE 3

Tests were conducted to establish a relationship between the amount of vacuum and the time of tumbling to receive a significant reduction in the appearance of holes in pork loins injected with various enhancement solutions having different levels of sodium bicarbonate.

First, sixty-four boneless pork loins were selected and sixteen pork loins were randomly assigned to four different sodium bicarbonate treatments. The pork loins were also treated under vacuum at 10 Torr and tumbled for 30 minutes at 6 RPM. The first treatment was the control treatment, which was 12% injection of an enhancement solution without sodium bicarbonate into the meat. The second treatment was injection of the enhancement solution containing 0.15% sodium bicarbonate. The third treatment was injection of the enhancement solution containing 0.30% sodium bicarbonate. The fourth treatment was injection of the enhancement solution containing 0.45% sodium bicarbonate. The pork loins were then injected with either 12% enhancement solution without sodium bicarbonate or 12% enhancement solution containing 0.15%, 0.30%, or 0.45% sodium bicarbonate, the percentage of enhancement solution based on the meat weight before injection, depending upon the assigned treatment.

The pork loins were then treated with one of the sodium bicarbonate levels under a 10 Torr vacuum with tumbling for 30 minutes. The pork loins were removed from the tumbler, vacuum packaged immediately after each tumbling cycle, shrink wrapped, and then placed in a steam kettle with boiling water, and boxed and stored at less than 40° F. for seven days. The pork loins were then removed from the vacuum packaging. The rib ends were removed from each pork loin and discarded. With each pork loin, a one inch chop and a six inch roast were randomly cut. The chops were cooked on a George Forman Grill and a gas grill to an internal temperature of 160° F., and the roasts were cooked in a convection oven at 350° F. to an internal temperature of 160° F. After cooking, the chops were sliced and scored in a cross-sectional view and the roasts were cut into three pieces and scored in a cross-sectional view to determine the percentage of holes in the meat.

The percentages of holes that appeared in the meat were determined based on an eight point scale, as previously noted in Example 1. The pork loins were tumbled for 30 minutes at 6 RPM under 10 Torr vacuum. The results of these tests are as follows in Table 4:

TABLE 4

Treatments for Pork Loin Roasts Cooked in a Convection Oven

| Tumbling Time (minutes) | Solution | Hole Score | Standard Deviation |
|---|---|---|---|
| No vacuum | Enhancement solution without sodium bicarbonate | 0.2187 | 0.2562 |
| 30 | Enhancement solution containing 0.15% sodium bicarbonate | 0.3125 | 0.3594 |
| 30 | Enhancement solution containing 0.30% sodium bicarbonate | 0.4687 | 0.4644 |
| 30 | Enhancement solution containing 0.45% sodium bicarbonate | 0.9375 | 0.7500 |

Even after tumbling for 30 minutes at 6 RPM under 10 Torr vacuum, higher levels of sodium bicarbonate (i.e. 0.45%) had more holes apparent in the roasts after cooking. This indicated that longer tumbling time or more vacuum would be helpful in reducing the appearance of holes.

EXAMPLE 4

In initial tests, tests were conducted to determine the optimum conditions to reduce the appearance of holes in cooked roasts from primals treated with a 12% enhancement solution containing 0.15% sodium bicarbonate. Generally, approximately twenty minutes of vacuum applied at 3.5 to 50 Torr was found to be optimal to achieve significant reduction in the appearance of holes, and the reduction continues to increase up to approximately thirty minutes. No significant additional reduction was observed with more than thirty minutes of vacuum. If tumbling is utilized in addition to the vacuum, ten minutes achieves comparable reduction in the appearance of holes as twenty minutes without tumbling. Twenty minutes of tumbling under vacuum eliminates the majority of holes appearing in the meat. Similarly, using warmer temperature meat (50° F. as opposed to 35° F.) with application of a ten minute vacuum achieves the same hole reduction as twenty minutes of vacuum application with 35° F. meat. The effect of vacuum treatment is the same regardless of the level of sodium bicarbonate used to treat the meat.

A subjective ten point scale was designed to score the amount of holes that appeared in the cooked product. A score of zero represented no holes in the meat and a score of ten represented meat that was filled with holes. A control product treated with sodium bicarbonate without vacuum treatment and a treatment product treated with sodium bicarbonate with vacuum treatment were used to determine the results of the tests. The following tables show the percentages that represent the average reduction in the appearance of holes for the treatment groups compared to the control group. For example, a control product having a score of seven and a treatment product having a score of three would result in a percentage of hole reduction for the treatment product of 57% because seven minus three divided by seven equals 0.57. This method was used because there is loin-to-loin variation on the level of holes seen in the control product.

A number of questions were investigated to help identify the source of the holes and how their appearance could be reduced. During these tests, boneless loins were used, and the vacuum was applied both continuously and intermittently. Unless otherwise noted, the temperature of the meat was approximately 35 to 45° F. when injected with sodium bicarbonate. However, this process also applies to other sodium bicarbonate injected meats and meat products, the terms "meats" and "meat products" being synonymous and meaning processed cuts of meat offered to the wholesale and retail buying public.

The first question was how long the vacuum should be applied to significantly reduce the appearance of holes. Initially, a 49 Torr vacuum was used to determine how much time was necessary to create a significant reduction in the appearance of holes. Twenty minutes provided the minimum amount of time necessary to create a significant reduction. Thirty minutes provided further improvement, but there was little additional improvement at forty minutes. The results are shown below in Table 5.

TABLE 5

Vacuum Application Using 49 Torr

| Vacuum Time (minutes) | Hole Reduction |
| --- | --- |
| 10 | 16.67% |
| 20 | 48.78% |
| 30 | 67.44% |
| 40 | 63.89% |

The second question was whether a stronger vacuum reduced the amount of time needed to reduce the appearance of holes. As the results shown below in Table 6 indicate, the stronger vacuum at 10 Torr for ten minutes reduced the appearance of holes more than 49 Torr. However, the advantage was not as clear as time increased.

TABLE 6

Vacuum Application Using 49 Torr and 10 Torr

| Vacuum Time (minutes) | Hole Reduction with 49 Torr | Hole Reduction with 10 Torr |
| --- | --- | --- |
| 10 | 16.67% | 30.80% |
| 20 | 48.78% | 53.69% |

In the preferred embodiment, the vacuum should not be applied at Torr levels less than 3.5 but may be applied at as little as 20 inches Hg, which is about 200 Torr. Vacuum applied at approximately 5 Torr provides a saturation temperature of approximately 34° F. In performing the vacuum treatment, the only variables of the vacuum are the time and the pressure in the vacuum vessel. Because many variables of the time and the pressure are recognized, as discussed above, the preferred range for approximately 20 minutes is approximately 3.5 to 50 Torr.

The third question was whether the same results would occur with the use of sodium carbonate rather than sodium bicarbonate. Cooked roasts containing sodium carbonate displayed similar levels of holes as cooked roasts containing sodium bicarbonate. Vacuum treatment of the product was not as effective in reducing the appearance of holes in the sodium carbonate sample as it was in the sodium bicarbonate sample. It is also recognized that other gas-releasing chemicals, such as, but not limited to, carbonates and bicarbonates, may have similar effects on the meat and the appearance of holes caused by such chemicals may be reduced using the present invention.

The fourth question was whether tumbling in addition to vacuum treatment would further reduce the appearance of holes in cooked product. It was found that tumbling under vacuum reduces the amount of time for applying the vacuum because it repeatedly compresses the meat and mechanically works the meat. There are various styles of tumblers that can be used such as CHALLENGE™ meat massager manufactured by Challenge-RMF Inc., FPEC manufactured by Food Processing Equipment Company, and POLAR-TEC manufactured by Wolf-tec, Inc. with a modified version of the HORMEL FOODS DEEP VACUUM SYSTEM. This modified system includes a vacuum chamber between the tumbler and the vacuum pump. A vacuum was pulled at 10 Torr for three minutes and then the product samples were either held under vacuum for the remaining time for non-tumbled product or gently tumbled for 1 to 12 rpm for tumbled product. Using the same amount of vacuum, product that was tumbled had fewer holes than non-tumbled product. Product tumbled for thirty minutes was essentially devoid of all holes. The results are shown below in Table 7.

TABLE 7

Comparison of Vacuum Application with Tumbling and Non-Tumbling

| Vacuum Time minutes | Hole Reduction for Tumbled | Hole Reduction for Non-Tumbled |
| --- | --- | --- |
| 10 | 38.33% (tumbled for 7 min.) | 11.76% |
| 20 | 87.71% (tumbled for 17 min.) | 52.38% |
| 30 | 100.00% (tumbled for 27 min.) | 66.67% |

The fifth question was whether vacuum treatment of higher temperature meat would result in fewer holes. It was found that meat of a higher temperature would contain fewer holes as shown in Table 16 below. The temperature of the meat is the only variable temperature in the process. The present invention would not work as well on frozen meat. Preferably, the meat should be above 28° F., and the desired temperature of the meat is typically about 35–40° F. Meat at 50° F. did increase results because moisture in warmer meat has a higher evaporation rate, however, microbes may thrive and spoil the meat. Vacuum was pulled at 10 Torr.

TABLE 8

Vacuum Application with Higher Temperature Meat

| Vacuum Time (minutes) | Warm Meat (50° F.) | Cold Meat (35° F.) |
|---|---|---|
| 10 | 44.78% | 29.85% |
| 20 | 77.19% | 47.37% |

The sixth question was whether a pulsated vacuum treatment could be used rather than tumbling under vacuum to knead the meat and result in the same effect. To create a pulsated vacuum treatment, the amount of pressure used and the application of the vacuum was varied to get a kneading effect on the meat. This was done by alternately opening and closing a vacuum vent valve on an interconnected vacuum vessel, pulsating between 10 and 50 Torr. Product that was subjected to a pulsated vacuum for ten minutes was slightly better than the control product, but the non-pulsed product that was subjected to a vacuum for ten minutes was more effective at reducing holes. At twenty minutes, both treatments were equally superior to the control product. The results are shown below in Table 9.

TABLE 9

Pulsated Vacuum Application

| Vacuum Time (minutes) | Regular Vacuum | Pulsated Vacuum |
|---|---|---|
| 10 | 31.75% | 9.52% |
| 20 | 60.00% | 67.14% |

Finally, the seventh question was whether higher levels of sodium bicarbonate required more vacuum time to reduce the appearance of holes in the cooked product. In product that has not been vacuum treated, a higher level of sodium bicarbonate will have more holes. However, levels of 0.15% and 0.25% sodium bicarbonate were treated with vacuum and the cooked products from the same loin were essentially identical. Typically, at least 0.15% sodium bicarbonate is used to benefit the meat, however, it is recognized that meat injected with any level of sodium bicarbonate sufficient to create holes in the meat may be treated with the method of the present invention to reduce the appearance of holes.

Other factors that may affect the present invention include the age of the meat, the amount of sodium bicarbonate used (0.5% sodium bicarbonate is the maximum amount allowed by the USFDA without approval), and the types of chemicals other than sodium bicarbonate that may be used.

The above specification, examples and data provide a complete description of the manufacture and use of the composition of the invention.

We claim:

1. A method for processing and treating meat, comprising:
   a) infusing meat with a gas-releasing chemical, the gas-releasing chemical creating holes in the meat upon cooking of the meat;
   b) placing the meat in a vessel;
   c) applying a vacuum within the vessel under conditions sufficient to reduce the appearance of holes in the meat after the meat has been cooked; and then
   d) cooking the meat.

2. A method for processing and treating meat to reduce the appearance of holes in the meat after the meat has been cooked, comprising:
   a) infusing meat with sodium bicarbonate;
   b) placing the infused meat in a vessel under conditions sufficient to reduce the appearance of holes in the meat after the meat has been cooked; then
   c) applying a vacuum within the vessel;
   d) cooking the meat.

3. The method of claim 2, further comprising tumbling the meat for a time during which the vacuum is being applied in step (c).

4. The method of claim 3, wherein the meat is tumbled for approximately 15 to 30 minutes under vacuum of approximately 10 Torr.

5. The method of claim 2, further comprising massaging the meat for a time during which the vacuum is being applied in step (c).

6. The method of claim 2, wherein the vacuum is applied for approximately 1.5 hours or less.

7. The method of claim 6, wherein the vacuum is applied for preferably 15 to 30 minutes.

8. The method of claim 2, wherein the vacuum is applied at preferably 3.5 to 50 Torr.

9. The method of claim 8, wherein the vacuum is applied for approximately 20 to 30 minutes.

10. The method of claim 2, wherein less than or equal to 0.50% sodium bicarbonate is infused into the meat.

11. The method of claim 10, wherein 0.10 to 0.50% sodium bicarbonate is infused into the meat.

12. The method of claim 11, wherein 0.30% sodium bicarbonate is infused into the meat.

13. The method of claim 2, wherein the vacuum is applied in a pulsating manner.

14. The method of claim 2, wherein the meat is pork.

15. The method of claim 2, wherein the meat is poultry.

16. A method for processing and treating meat to reduce the appearance of holes in the meat after the meat has been cooked, comprising:
   a) infusing meat with at least 0.15% sodium bicarbonate;
   b) placing the infused meat in a vessel;
   c) applying vacuum at approximately 3.5 to 50 Torr within the vessel for at least 15 minutes;
   d) cooking the meat.

17. The method of claim 16, further comprising tumbling the meat for a time during which the vacuum is being applied in step (c).

18. The method of claim 16, further comprising massaging the meat for a time during which the vacuum is being applied in step (c).

19. The method of claim 16, wherein 0.30% sodium bicarbonate is infused into the meat.

20. The method of claim 19, wherein vacuum at 10 Torr is applied within the vessel.

21. The method of claim 20, wherein vacuum is applied for approximately 20 to 30 minutes.

22. A method for processing and treating meat, comprising:
   a) infusing meat with a gas-releasing chemical, the gas-releasing chemical being used to preserve the meat;
   b) placing the infused meat in a vessel;
   c) applying a vacuum within the vessel, the vacuum expanding and removing gases within the meat from the gas-releasing chemical; and
   d) cooking the meat.

23. The method of claim 22, wherein the gas-releasing chemical is sodium bicarbonate.

* * * * *

UNITED STATES PATENT AND TRADEMARK OFFICE
CERTIFICATE OF CORRECTION

PATENT NO. : 7,060,309 B2
APPLICATION NO. : 10/361808
DATED : June 13, 2006
INVENTOR(S) : Paterson et al.

Page 1 of 1

It is certified that error appears in the above-identified patent and that said Letters Patent is hereby corrected as shown below:

Column 12, line 7, claim 2: "cooked; then" should read --cooked; and then--

Column 12, line 42, claim 16: after "15 minutes;" insert --and then--

Column 12, line 60, claim 22: after "within the vessel" insert --under conditions sufficient to reduce the appearance of holes in the meat after the meat has been cooked--

Column 12, line 62, claim 22: after "chemical; and" insert --then--

Signed and Sealed this

Fourteenth Day of September, 2010

David J. Kappos
*Director of the United States Patent and Trademark Office*